US012682871B2

(12) United States Patent
Goto

(10) Patent No.: US 12,682,871 B2
(45) Date of Patent: Jul. 14, 2026

(54) TREMOLO UNIT AND SADDLE

(71) Applicant: GOTOH GUT CO., LTD., Isesaki (JP)

(72) Inventor: Masaki Goto, Isesaki (JP)

(73) Assignee: GOTOH GUT CO., LTD., Isesaki (JP)

( * ) Notice: Subject to any disclaimer, the term of this patent is extended or adjusted under 35 U.S.C. 154(b) by 22 days.

(21) Appl. No.: 18/462,506

(22) Filed: Sep. 7, 2023

(65) Prior Publication Data

US 2024/0087544 A1 Mar. 14, 2024

(30) Foreign Application Priority Data

Sep. 12, 2022 (JP) ................................ 2022-144420

(51) Int. Cl.
*G10D 3/153* (2020.01)
*G10D 3/04* (2020.01)
*G10H 3/18* (2006.01)

(52) U.S. Cl.
CPC ............... *G10D 3/153* (2020.02); *G10D 3/04* (2013.01); *G10H 3/18* (2013.01)

(58) Field of Classification Search
None
See application file for complete search history.

(56) References Cited

U.S. PATENT DOCUMENTS 4,512,232 A * 4/1985 Schaller ................. G10D 3/153 84/267
4,903,568 A * 2/1990 Itoh ........................ G10D 3/153 84/313
5,539,143 A * 7/1996 Rose ...................... G10D 3/153 84/307

(Continued)

FOREIGN PATENT DOCUMENTS

CN 103632654 A * 3/2014
GB 2304224 A * 3/1997 ............... G10D 3/14

(Continued)

OTHER PUBLICATIONS

Translation of JP-2001272972-A document "P" above (Year: 2001).*

(Continued)

*Primary Examiner* — Patrick McAtee
(74) *Attorney, Agent, or Firm* — Chrisman Gallo Tochtrop LLC

(57) ABSTRACT

A tremolo unit is provided, in which string can be strongly tightened and stably clamped. The tremolo unit including a base plate 10 arranged on a surface of a string instrument and a saddle 100 attached on a surface of the base plate 10. The saddle 100 includes a saddle main body 110 and a clamper 160 rotatably attached to the saddle main body 110, and the saddle main body 110 includes a penetrating hole 140 through which a string is inserted and a saddle part 120 receiving a string drawn from the penetrating hole 140 to a neck side of a string instrument. The clamper 160 is supported in a condition in which a supporting part 161 is rotatably supported in order to enable an end part of a neck side of the saddle part 120 side to approach closer to and be further away from the saddle part 120, and at an end part opposite to the neck side of the clamper 160, an operating part 164 is arranged which makes the end part move away from the saddle main body 110 by pressing the saddle main body 110.

5 Claims, 5 Drawing Sheets

(56) References Cited

U.S. PATENT DOCUMENTS

| | | | | |
|---|---|---|---|---|
| 5,808,216 A * | 9/1998 | Fisher, IV | G10D 3/153 | 84/313 |
| 2002/0194977 A1* | 12/2002 | Hirayama | G10D 3/153 | 84/313 |
| 2003/0066409 A1* | 4/2003 | Hirayama | G10D 3/153 | 84/313 |
| 2004/0177741 A1* | 9/2004 | Hirayama | G10D 3/153 | 84/313 |
| 2005/0160897 A1* | 7/2005 | Hirayama | G10D 3/153 | 84/307 |
| 2005/0204892 A1 | 9/2005 | Minakuchi | | |
| 2006/0179999 A1* | 8/2006 | LaMarra | G10C 3/04 | 84/298 |
| 2013/0019736 A1* | 1/2013 | Finkle | G10D 3/00 | 84/313 |
| 2013/0186255 A1 | 7/2013 | Mccabe | | |
| 2015/0294651 A1* | 10/2015 | Heuss | G10D 3/04 | 84/298 |
| 2016/0232881 A1* | 8/2016 | Alday | G10D 3/153 | |
| 2019/0206373 A1* | 7/2019 | Penland | G10H 3/20 | |

FOREIGN PATENT DOCUMENTS

| | | | | |
|---|---|---|---|---|
| JP | 6160298 U * | 4/1986 | | |
| JP | 61-79396 U | 5/1986 | | |
| JP | 2001272972 A * | 10/2001 | | |
| JP | 2002123254 A * | 4/2002 | | |
| JP | 2005-266453 A | 9/2005 | | |
| JP | 2015-052711 A | 3/2015 | | |
| KR | 20110002945 A * | 1/2011 | | |
| WO | WO-2015034039 A1 * | 3/2015 | | G10D 1/085 |

OTHER PUBLICATIONS

Translation of KR-20110002945-A document "R" above (Year: 2011).*

Japanese Office Action dated Feb. 18, 2026 for corresponding Japanese Application No. 2022-144420 and English translation.

* cited by examiner

TREMOLO UNIT AND SADDLE

CROSS-REFERENCE TO RELATED APPLICATIONS

This application claims the benefit of Japanese Application No. 2022-144420 filed on Sep. 12, 2022, the entire disclosure of which is hereby incorporated herein by reference.

TECHNICAL FIELD

The present invention relates to a tremolo unit attached to an electric guitar or an electric bass guitar, and relates to a technique in which a string is strongly clamped by a simple structure.

BACKGROUND ART

Among stringed instruments such as an electric guitar or an electric bass guitar, those in which a tremolo unit is attached in order to generate bending or vibrato by moving pitch of a sound up and down during playing of the instrument, are known. For example, in Patent document 1, a tremolo unit is disclosed having a structure in which a base plate is attached to surface of electric guitar, a tremolo block extending at backside of the base plate thickness direction is attached to the base plate, and a saddle is attached at the surface of the base plate.

A penetration hole extending along a plate thickness direction is formed in the tremolo block, a string is inserted in the penetration hole, a string ball is engaged to a string ball stopper at the end part of the penetration hole, the string is hung on the saddle and the string end is spooled so as to tune a tuning peg. A space containing the tremolo block is formed in a body of the electric guitar, and a coil spring is attached between the end part of the tremolo block and the body of the electric guitar. According to this structure, the tremolo block is always biased to a direction stretching string, and by operating a tremolo arm attached to the base plate, the tremolo block is inclined in a condition in which an end part of neck side of the base plate is a supporting point, tensile strength of the string changes, and the pitch of sound changes.

PATENT DOCUMENTS

Patent document 1: Japanese Unexamined Patent Application Publication No. 2015-52711 (FIG. 1)

SUMMARY OF INVENTION

In the tremolo unit having the above structure, a pitch of a sound when a string is plucked is determined according to tensile force on the string between a saddle and a tuning peg. By operating a tremolo arm, a distance between the saddle and the tuning peg changes, tensile force of the string changes, and therefore pitch of sound changes. However, because a part of the string also exists between the string ball stopper and the saddle, the string is stretched and shortened also in the part, thereby generating deviation in tuning between the saddle and the tuning peg.

Therefore, a technique has been used in which a string is clamped at a saddle. For example, a structure is known in which a screw is screwed in the saddle, the string is tightened between a head part of the screw and an upper surface of the saddle, and thereby, the string is fixed between the screw and the tuning peg.

However, in the abovementioned clamping method, there is a problem in that an oblique force acts on the head part of the screw and a clamping force is reduced by deformation of a neck part of the screw. Therefore, the present invention has been completed in view of the above circumstances, and an object of the present invention is to provide a tremolo unit in which a string can be strongly tightened and be clamped stably.

An aspect of the present invention is a tremolo unit including: a base plate arranged at a surface of a string instrument, a saddle attached at a surface of the base plate, an arm attaching part arranged at a surface of the base plate, and a block fixed on the base plate and extending along a plate thickness direction on a back side of the base plate, wherein the block includes a string ball locking part through which a string is inserted and on which a string ball is locked; the saddle includes a saddle main body and a string pressing member rotatably attached to the saddle main body; the saddle main body includes a string inserting part through which a string is inserted from the block side and a string receiving part at which a string drawn from the string inserting part to a neck side of a string instrument is received; the string pressing member is supported in a condition in which a supporting part is rotatably supported in order to enable an end part of neck side of the string receiving part side to approach closer and be further away from the string receiving part, and at an end part opposite to the neck side of the string pressing member, an operating part is arranged which makes the end part move away from the saddle main body by pressing the saddle main body.

In the tremolo unit having the above structure, if the end part opposite to the neck side of the string pressing member is made to move away from the saddle main body by the operating part, because the end part of the neck side of the string pressing member moves toward the string receiving part and the string is tightened, the string can be strongly tightened at the string receiving part and be stably clamped.

Here, it is desirable that the operating part be a screw which is screwed to the string pressing member, and that the top end of the screw contact the saddle main body. In this structure, if the screw is rotated in a forward direction (tightening direction), the operating part moves to the head part side of the screw along a spiral of the screw, and the top part of the string pressing member moves to the string receiving part side so as to tighten the string. In this way, a clamping mechanism for the string can be realized by a simple structure.

Furthermore, it is desirable that a shaft be fixed to the supporting part of the string pressing member, and that it be rotatably supported at the supporting part of the saddle main body arranged at both sides of the string pressing member. In this structure, the supporting part of the string pressing member is supported via both sides, and support is reliable.

In this case, it is desirable that a concave part having an opening part at a side part of a neck side be formed at a supporting part of the saddle main body, and that the shaft is contained in the concave part via the opening part. In this structure, the string pressing member to which a shaft is fixed can be easily attached to the saddle.

Furthermore, it is desirable that the string receiving part includes an inclining surface which is a rising slope toward the neck side, and top part of the string pressing member has a shape fitting to the inclining surface. In this structure, because the string is drawn to the neck side at the top part which is after the rising of the inclining surface, some of the tensile force of the string is received on a corner toward the top part. Therefore, a holding property with respect to tensile force of the string is high, and slack of the string can be reduced.

In addition, another aspect of the present invention is that the saddle is attached to a base plate of a tremolo unit or a bridge of a string instrument, wherein the saddle includes a saddle main body and a string pressing member rotatably attached to the saddle main body; the saddle main body includes a string inserting part through which a string is inserted from the block side, and a string receiving part at which a string drawn from the string inserting part to a neck side of string instrument is received; the string pressing member is supported in a condition in which a supporting part is rotatably supported in order to enable an end part of a neck side of the string receiving part side approaching to and moving away from the string receiving part; and at an end part opposite to the neck side of the string pressing member, an operating part is arranged which makes the end part move away from the saddle main body by pressing the saddle main body.

Effects of Invention

According to the tremolo unit of the present invention, a tremolo unit can be provided in which the string can be strongly tightened and be stably clamped.

EMBODIMENTS OF INVENTION

1. First Embodiment

Figure 1:
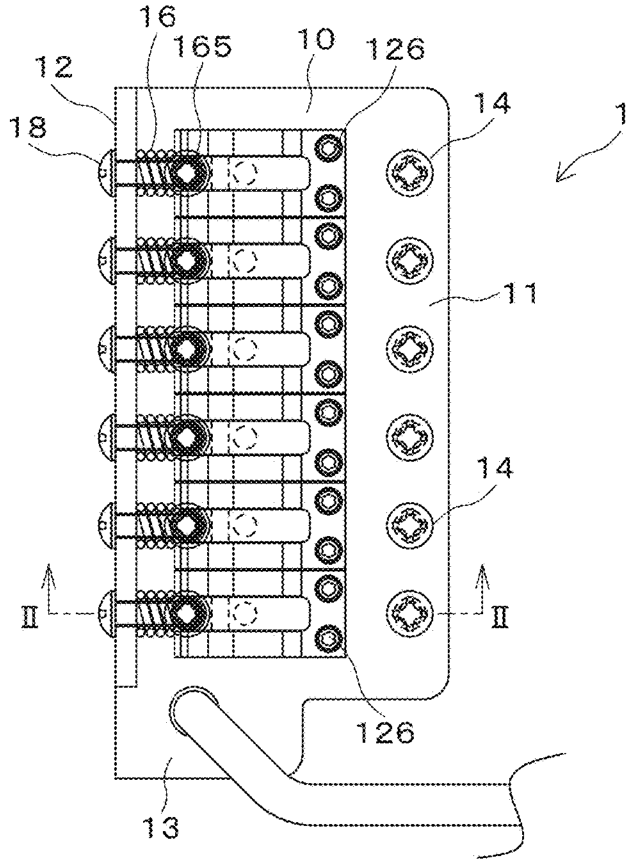
FIG. 1 is a plan view showing the tremolo unit of the First Embodiment of the present invention.
Figure 2:
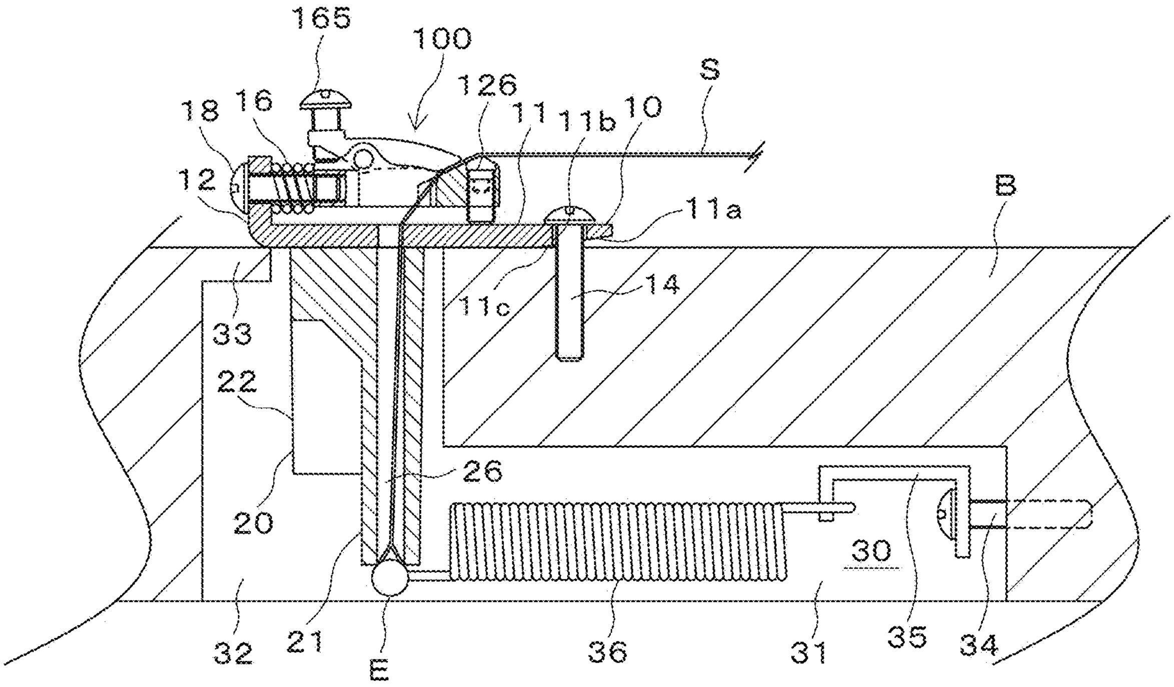
FIG. 2 is a cross sectional view seen from line II-II in FIG. 1.

Hereinafter the First Embodiment of the present invention is explained with reference to the drawings. FIG. 1 is a plan view showing the tremolo unit 1 of the First Embodiment, and FIG. 2 is a cross sectional view seen from line II-II in FIG. 1. The tremolo unit 1 is attached to a body B of an electric guitar. It should be noted that in the following explanation, a neck side of the electric guitar and its opposite side are called a front end side and a back end side, respectively. In addition, the terms “up” and “down” used in the following explanation indicate the up and the down direction when the electric guitar is placed on a flat plate, and “left” and “right” indicate a direction perpendicular to the up and down direction when facing to the front end side.

In the Figure, reference numeral 10 is a base plate. The base plate 10 consists of a flat plate part 11 having rectangular shape when seen in plan view, a side plate part 12 extending from end part of a back end side of the flat plate part 11 upwardly, and a flange part 13 projecting from one side of the right side of the flat plate part 11 toward the right direction.

As shown in FIG. 2, on a lower surface of front end part of the flat plate part 11, an inclining surface 11*a* of which the thickness is reduced toward the front end side is formed. Furthermore, at the front end part of the flat plate part 11, a penetrating hole 11*b* is formed overlapping the inclining surface 11*a*. In the penetrating hole 11*b*, a screw 14 of which the outer diameter is smaller than the inner diameter of the hole is inserted, and the screw 14 is screwed in the body B.

The flange part 13 includes a penetrating hole 13*a* which itself penetrates from the back to the front of the flange part 13, and a base part of the tremolo arm A that penetrates the hole. A gap is formed between the inner surface of the penetrating hole 13*a* and the outer surface of the base part of the tremolo arm A.

Figure 3:
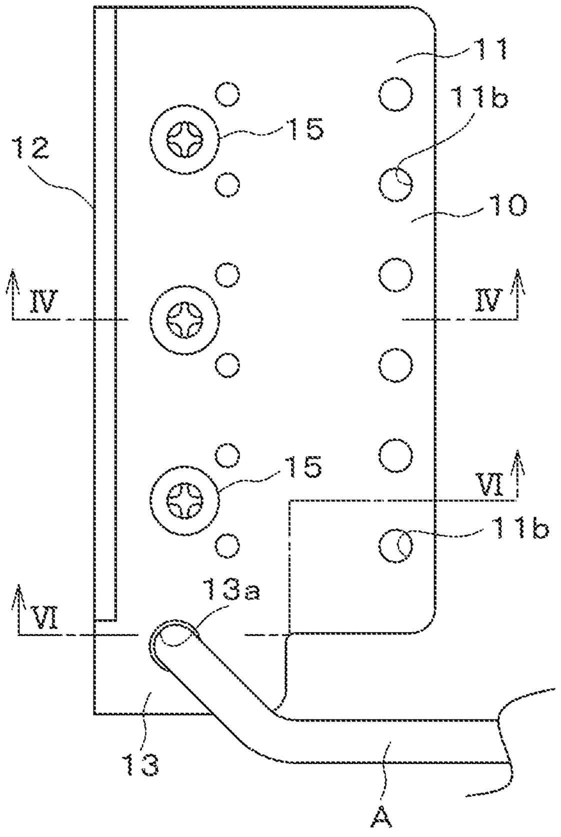
FIG. 3 is a plan view in a condition in which there is no saddle in the tremolo unit of the First Embodiment.
Figure 4:
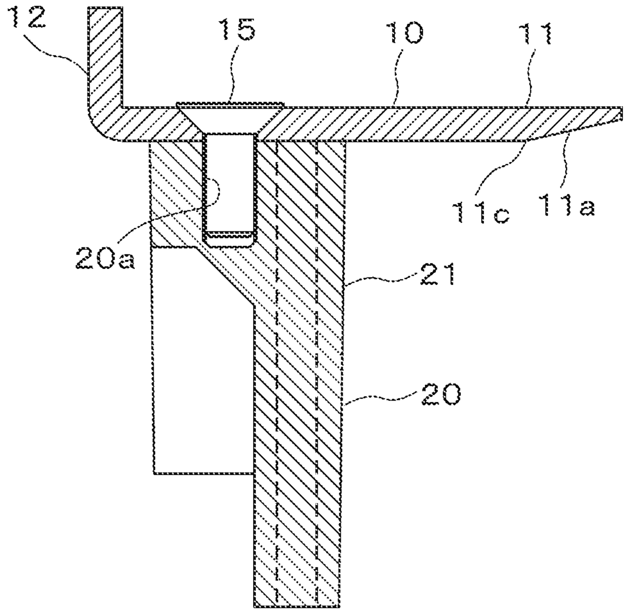
FIG. 4 is a cross sectional view seen from line IV-IV in FIG. 3.

A block 20 is attached on the back surface of the base plate 10. As shown in FIGS. 3 and 4, a flat head screw 15 penetrates the flat plate part 11 and is screwed into a screw hole 20*a* formed on the block 20, so that the block 20 is attached to the base plate 10. The block 20 is contained in a space 30 formed on a back surface of the electric guitar.

Figure 5:
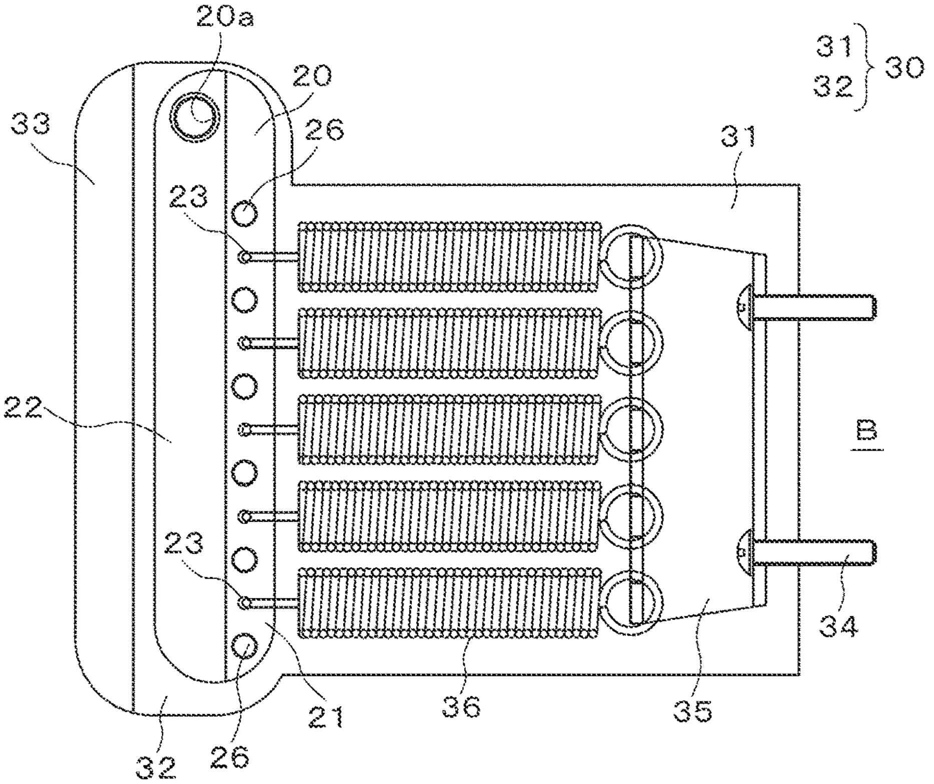
FIG. 5 is a back view showing the tremolo unit of the First Embodiment.
Figure 6:
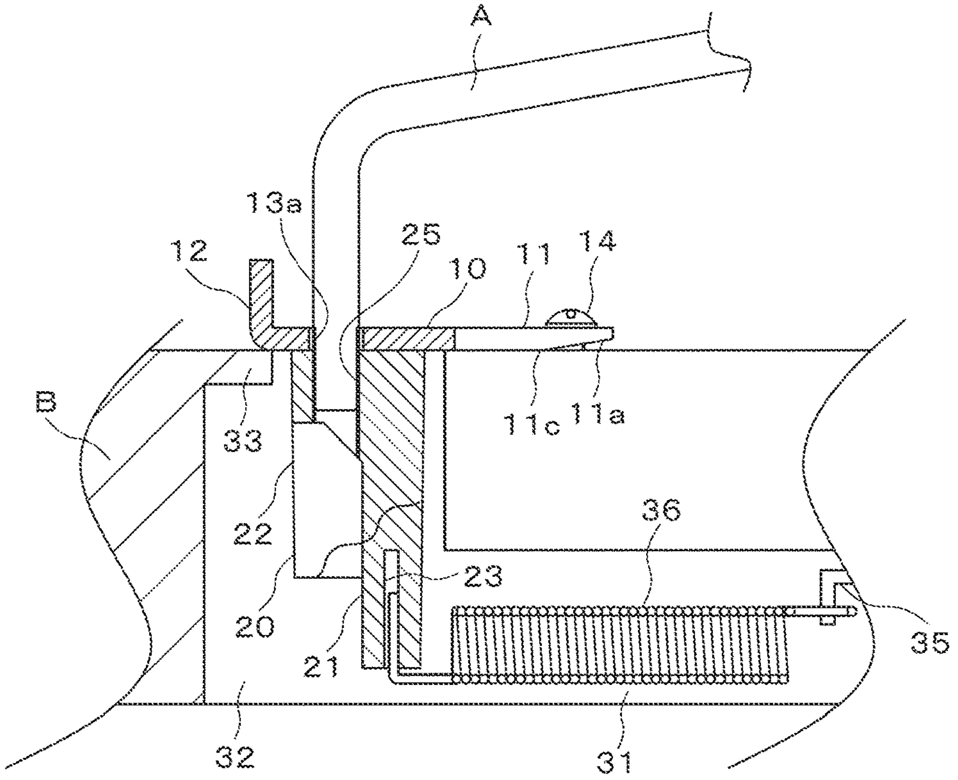
FIG. 6 is a cross sectional view seen from line VI-VI in FIG. 3.
Figure 7A:
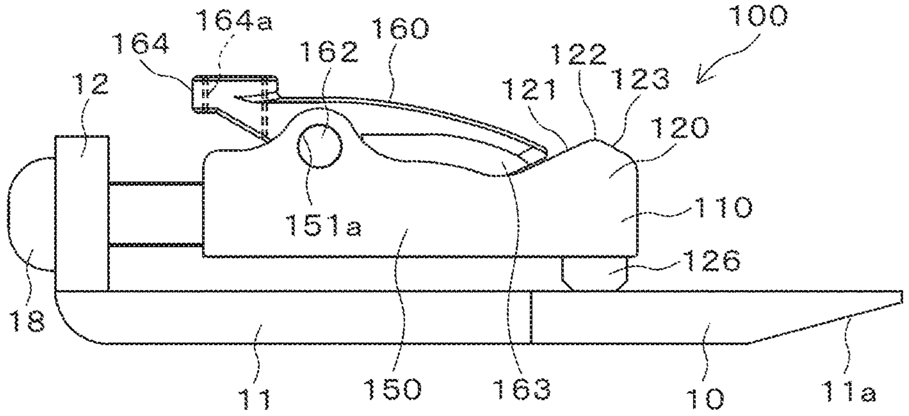
FIG. 7A is a side view.
Figure 7B:
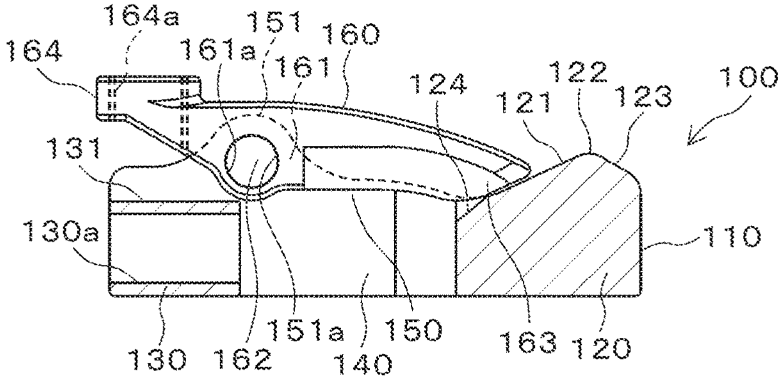
FIG. 7B is a cross sectional view.
Figure 7C:
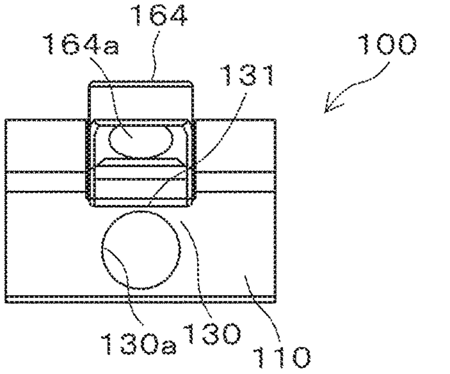
FIG. 7C is a back view.
Figure 7D:
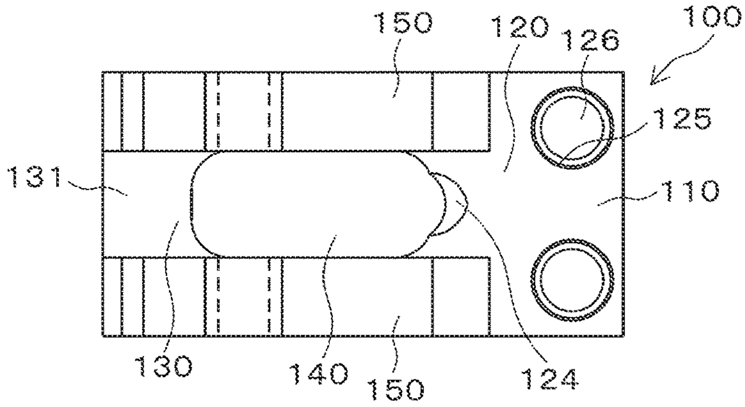
FIG. 7D is a plan view, all showing the saddle in the First Embodiment.
Figure 8:
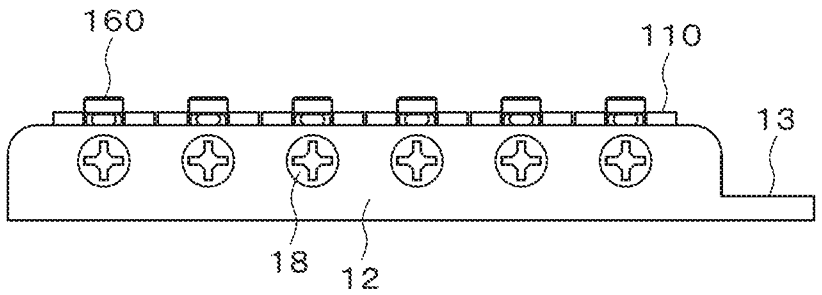
FIG. 8 is a back view of the tremolo unit of the First Embodiment.

As shown in FIGS. 5 and 6, the space 30 consists of a rectangular space 31 of the front end side and a rounded rectangle 32 adjacent to the back end side of the rectangular space 31. The rectangular space 31 has a depth reaching almost to the middle of the body B of the electric guitar. At a depth around a surface of the body B in the rounded rectangle 32, a canopy part 33 is formed from the back end of the rounded rectangle 32 to a part overlapping the side plate part 12 of the base plate 10. A part of front end side of the canopy part 33 is adjacent to the surface of body B. The rounded rectangle 32 is formed in a condition in which it cannot be seen from a surface side of the body B hidden by the base plate 10.

The block 20 is a rounded rectangle shape as seen in plan view. The block 20 consists of a pressing part 21 of a front end side extending to proximate to the back surface of the body B, and an actuation part 22 extending to a near side of the pressing part 21. The abovementioned flat head screw 15 is screwed into the screw hole 20*a* formed in the actuation part 22 (see FIG. 4).

On the lower end surface of the pressing part 21, multiple (five in this example) holes 23 are formed. On the other hand, a screw 34 is screwed in an inner surface of the rectangular space 31 formed in a back surface of the body B, one end part of coil spring 36 is attached to the screw 34 via a connecting member 35, and the other end part of the coil spring 36 is connected to the hole 23. According to this structure, the block 20 is biased in the counterclockwise direction in FIG. 6.

An arm attaching hole (arm attaching part) 25 is formed in the actuation part 22 of the block 20, and the arm attaching hole 25 overlaps the penetrating hole 13*a* of the base plate 10. A bush made of resin, for example, is engaged in the arm attaching hole 25. By pressing and inserting the base part of the tremolo arm A into the bush, the arm is rotatably fixed. That is, a user sets the tremolo arm A at a desirable position by rotating it; however, since the base part of a tremolo arm A is tightened by the bush having some strength, it does not rotate accidentally.

When the instrument is played, the player presses the tremolo arm A toward the body B side. Then, the base plate 10 is inclined in a clockwise direction in a condition in which back end edge 11*c* (see FIG. 6) of the inclining surface 11*a* is a pivot point, tensile force acting on the string S is reduced, and pitch of sound is decreased.

As shown in FIG. 5, multiple (six in this example) string inserting holes (string inserting parts) 26 are formed in the pressing part 21 of the block 20, wherein each hole 26 penetrates the pressing part 21 along an up and down direction. Between the string inserting holes 26, the hole 23 into which coil spring 36 is connected is located. The string S is inserted into the string inserting hole 26, and string ball E of the string S (see FIG. 2) engages an edge part of the string inserting hole 26. Then, the string S is drawn from the string inserting hole 26, and is clamped by a saddle 100.

FIG. 7 shows the saddle 100. The saddle 100 is placed on the base plate 10, and consists of a saddle main body 110 and a clamper (string pressing member) 160. The saddle main body 110 is a rectangular shape seen in plan view, and includes a saddle part (string receiving part) 120 at the front end side and a screw receiving part 130 at the back end side. Furthermore, a penetrating hole (string inserting part) 140 is formed between the saddle part 120 and the screw receiving part 130, and supporting parts 150 are formed at both left and right sides of the penetrating hole 140.

In the saddle part 120, a primary inclining surface 121 rising from end part of the front end side of the penetrating hole 140 and forming a rising slope is formed, and a secondary inclining surface 123 being a descending slope from the top part 122 of the primary inclining surface 121 is formed.

A beveled part 124 is formed at boundary of the primary inclining surface 121 and the penetrating hole 140. The string S drawn from the string inserting hole 26 of the block 20 is inserted into the penetrating hole 140 and is hung on the beveled part 124 and the primary inclining surface 121, and is wound around a tuning peg equipped in a head of the electric guitar.

A pair of screw holes 125 is formed in the saddle part 120, and a stopping screw 126 is screwed in each of the screw hole 125. The top part of the stopping screw 126 contacts a surface of the base plate 10, and by rotating the stopping screw 126, position of the screw hole 125 along an up and down direction changes, and therefore, height of the saddle 100, that is, string height, can be adjusted.

The supporting part 150 includes convex parts 151 located at both sides of the back end part of the penetrating hole 140 and projecting upwardly. A hole 151*a* penetrating along left and right direction is formed in the convex part 151. A shaft 162 of a clamper 160, explained below, is supported in the hole 151*a* in a rotatable condition.

The upper surface of a screw receiving part 130 is a flat surface 131, and it is pressed by contacting a top of a screw 165 (see FIGS. 1 and 2) attached to the clamper 160. Furthermore, a screw hole 130*a* penetrating in front and back direction is formed in the screw receiving part 130.

Screws 18 are rotatably supported by the side plate part 12 of the base plate 10, and a coil spring 16 into which the screw 18 penetrates (see FIGS. 1 and 2) is arranged between the side plate part 12 and the screw receiving part 130 in a compressed condition. The top part of the screw 18 is screwed in the screw hole 130*a* of the screw receiving part 130. By rotating the screw 18, the saddle 100 moves in a front and back direction along the spiral of screw 18, and therefore, effective string length from the saddle 100 to the tuning peg can be adjusted.

The clamper 160 has a long shape and a constant width and extends along a front and back direction. At intermediate part along a longitudinal direction of the clamper 160, a supporting part 161 projecting further downwardly than a front part and a back part is formed. A penetrating hole 161*a* penetrating in a left and right direction is formed in the supporting part 161, and a shaft 162 is fixed in the penetrating hole 161*a* by a method such as press fitting. The shaft 162 is inserted in the hole 151*a* of the saddle main body 110 in a rotatable condition.

A pressing part 163 is arranged at the front end side of the supporting part 161. A lower surface of the pressing part 163 has a shape fitting to the primary inclining surface 121 of the saddle main body 110. Furthermore, an operating part 164 is arranged at the back end side of the supporting part 161. The operating part 164 is arranged above the screw receiving part 130, and a screw hole 164*a* is formed therein. A screw 165 is attached to the screw hole 164*a*. The top of the screw 165 contacts the flat surface 131 of the screw receiving part 130.

2. Effect

According to the above-explained structure, if the screw 165 is rotated in a forward direction (tightening direction), because the top of the screw 165 contacts the flat surface 131 of the screw receiving part 130, the operating part 164 moves to a head part 165*a* side of the screw 165 along the spiral of screw 165, the pressing part 163 of the clamper 160 moves to the primary inclining surface 121 side of the saddle main body 110, and the string S is tightened. Therefore, the string S can be reliably clamped.

In particular, in the First Embodiment above, because it is a structure in which the operating part 164 moves by the screw 165 screwed in the operating part 164, a clamping mechanism for a string can be realized by a simple structure.

In addition, in the above First Embodiment, because the shaft 162 is fixed to the supporting part 161 of the clamper 160 and is rotatably supported in the supporting part 150 of the saddle main body 110 arranged on both sides of the clamper 160, the supporting part 161 of the clamper 160 is supported at both sides, and support is stabilized.

Furthermore, because the saddle main body 110 includes the primary inclining surface 121 being a rising slope toward the front end side, and the pressing part 163 of the clamper 160 has a shape fitting to the primary inclining surface 121, the string S is drawn at the top part 122 that is highest at the primary inclining surface 121 to the front end side, and some of the tensile force of the string S is received at a corner toward the top part 122. Therefore, holding property with respect to tensile force of the string S is high, and slack of the string S can be reduced.

3. Second Embodiment

Figure 9:
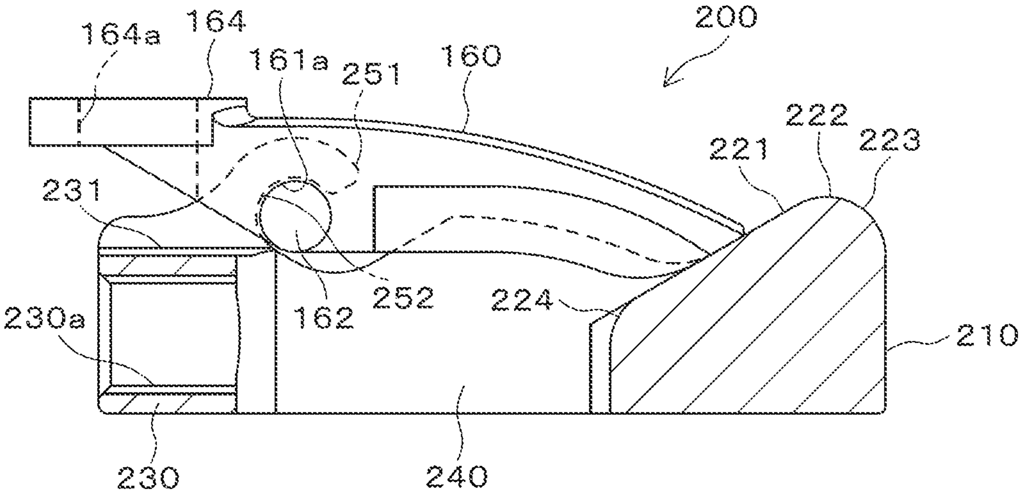
FIG. 9 is a cross sectional view showing the saddle in the Second Embodiment of the present invention.
Figure 10:
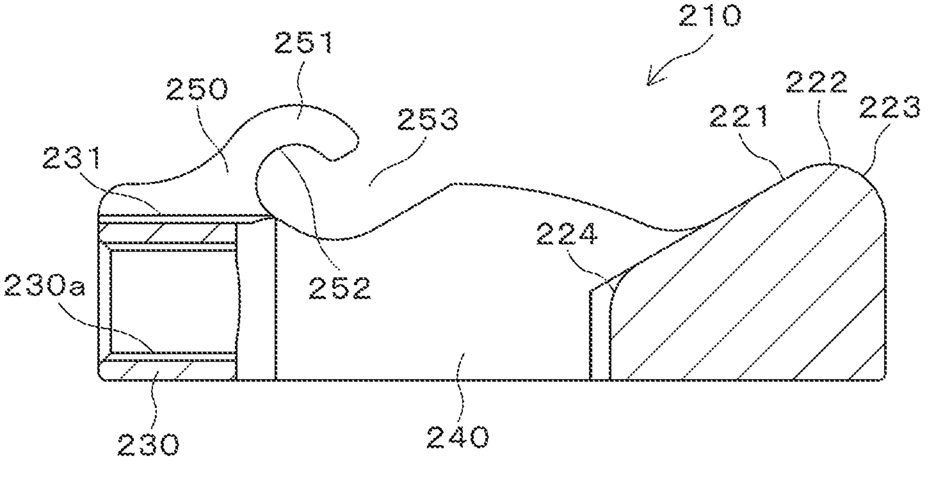
FIG. 10 is a cross sectional view showing the saddle main body of the Second Embodiment.

The Second Embodiment of the present invention is explained with reference to FIGS. 9 and 10. The Second Embodiment differs from the First Embodiment only in the structure of saddle main body. Therefore, in the following explanation, the same reference numeral is given to a constituent element similar to that in the First Embodiment, and explanation thereof is omitted.

A saddle 200 has a structure in which the clamper 160 is rotatably supported by a saddle main body 210. The saddle main body 210 has a rectangular shape seen in plan view, and it includes a saddle part (string receiving part) 220 at the front end side and a screw receiving part 230 at the back end side. In addition, a penetrating hole 240 is formed between the saddle part 220 and the screw receiving part 230, and supporting parts 250 are formed at both sides of the left and right of the penetrating hole 240.

In the saddle part 220, a primary inclining surface 221 rising from an edge part of the front end side of the penetrating hole 240 to be a rising slope is formed, and a circular cylindrical surface 223 of which the cross section is a circular arc shape is formed beyond the top part 222 of the primary inclining surface 221.

A beveled part 224 consisting of a circular cylindrical curve surface is formed at a boundary of the primary inclining surface 221 and the penetrating hole 240. The string S drawn from the string inserting hole 26 of the block 20 is inserted into the penetrating hole 240, is hung on the beveled part 224 and the primary inclining surface 221, and is wound around the tuning peg attached at a head of an electric guitar.

It should be noted that although not shown in the drawing, a pair of screw holes penetrating along an up and down direction are formed in the saddle part 220, and a stopping screw is screwed in each screw hole. The top part of the stopping screw contacts a surface of the base plate 10, and by rotating the stopping screw, position of the screw hole along an up and down direction changes, and height of the saddle 200, that is, string height, can be adjusted.

A supporting part 250 includes a convex part 251 located at both sides of the back end part of the penetrating hole 240 and projects upwardly. A concave part 252 penetrating in a left and right direction is formed in the convex part 251. The concave part 252 includes an opening 253 which is open to the front end side, and in the concave part 252, the shaft 162 of the clamper 160 is inserted via the opening 253 and is supported in a rotatable condition.

The upper surface of the screw receiving part 230 is a flat surface 231, and the top of the screw 165 (see FIGS. 1 and 2) attached to the clamper 160 contacts and presses the flat surface. In addition, a screw hole 230*a* penetrating in a front and back direction is formed in the screw receiving part 230.

In the tremolo unit of the above Second Embodiment, effects similar to the First Embodiment are obtained, and furthermore, because the shaft 162 of the clamper 160 is inserted through the opening 253 of the concave part 252 and is supported in a rotatable condition, the clamper 160 can be easily attached in the saddle 200.

4. Modifications

The present invention is not limited only to the above embodiments, and various modifications are possible, as follows.

i) In the above embodiment, the operating part 164 is moved by the screw 165; however, a similar structure can be accomplished by a comb. For example, a neck part of pin having shape of a bolt is rotatably supported in the operating part 164, and a comb surface is formed at the top of the pin. On the other hand, a comb receiving surface which the above comb surface contacts is formed on an upper surface of the screw receiving part 130, and by rotating the comb surface with respect to the comb receiving surface, the pin moves upwardly.

ii) As another example of the above modification, a coil spring can be inserted between the operating part 164 of the clamper 160 and the flat surface 131 of the screw receiving part 130. In this case, it is necessary that the pressing part 163 of the clamper 160 be away from the saddle part 120 of the saddle 100 in order to insert the string S; however, for example, a structure is possible in which a bar covering from operating part 164 of one end to operating part 164 of the other end of the clamper 160 is arranged, a bolt is inserted into both end parts of the bar, and the top of the bolt is screwed in a screw hole formed on the base plate 10 so that the operating part 164 is pressed down.

iii) The present invention is not limited to a tremolo unit for electric guitars or electric bass guitars, and it may also be used in various string instruments such as acoustic guitars, mandolins, and the like, and it can also be applied to a bridge which is not a tremolo unit.

The present invention can be desirably applied to commercial tremolo units and the like for electric guitars and electric base guitars.

EXPLANATION OF REFERENCE NUMERALS

1: tremolo unit, 10: base plate, 11: flat plate part, 11*a*: inclining surface, 11*b*: penetrating hole, 11*c*: back end edge, 12: side plate part, 13: flange part, 13*a*: penetrating hole, 14: screw, 15: flat head screw, 16: coil spring, 18: screw, 20: block, 20*a*: screw hole, 21: pressing part, 22: actuation part, 23: hole, 25: arm attaching hole (arm attaching part), 26: string inserting hole (string inserting part), 30: space, 31: rectangular space, 32: rounded rectangle, 33: canopy part, 34: screw, 35: connecting member, 36: coil spring, 100: saddle, 110: saddle main body, 120: saddle part (string receiving part), 121: primary inclining surface, 122: top part, 123: secondary inclining surface, 124: beveled part, 125: screw hole, 126: stopping screw, 130: screw receiving part, 130*a*: screw hole, 131: flat surface, 140: penetrating hole (string inserting hole), 150: supporting part, 151: convex part, 151*a*: hole, 160: clamper (string pressing member), 161: supporting part, 161*a*: penetrating hole, 162: shaft, 163: pressing part, 164: operating part, 164*a*: screw hole, 165: screw, 165*a*: head part, 200: saddle, 210: saddle main body, 220: saddle part (string receiving part), 221: primary inclining surface, 222: top part, 223: cylindrical part, 224: beveled part, 230: screw receiving part, 230*a*: screw hole, 231: flat surface, 240: penetrating hole, 250: supporting part, 251: convex part, 252: concave part, 253: opening, A: tremolo arm, B: body, and S: string.

What is claimed is:

1. A tremolo unit comprising:

a base plate arranged at a surface of a string instrument;

a saddle attached at a surface of the base plate;

an arm attaching part arranged at a surface of the base plate; and a block fixed on the base plate and extending along a plate thickness direction on a back side of the base plate, wherein the block includes a string ball locking part through which a string is inserted and on which a string ball is locked, wherein the saddle includes a saddle main body and a string pressing member rotatably attached to the saddle main body, wherein the saddle main body includes a string inserting part through which a string is inserted from the block side and a string receiving part at which a string drawn from the string inserting part to a neck side of string instrument is received, wherein the string pressing member is supported in a condition in which a supporting part is rotatably supported in order to enable an end part of the neck side of the string receiving part side to approach closer and be further away from the string receiving part, wherein at an end part opposite to the neck side of the string pressing member, an operating part is arranged which makes the end part move away from the saddle main body by pressing the saddle main body, and wherein the string receiving part includes an inclining surface which is a rising slope toward the neck side, and a top part of the string pressing member has a shape fitting to the inclining surface.

2. The tremolo unit according to claim 1, wherein the operating part is a screw which is screwed to the string pressing member, and the top end of the screw contacts the saddle main body.

3. The tremolo unit according to claim 2, wherein a shaft is fixed to the supporting part of the string pressing member, and is rotatably supported at a supporting part of the saddle main body arranged at both sides of the string pressing member.

4. The tremolo unit according to claim 3, wherein a concave part having an opening part at a side part of a neck side is formed at a supporting part of the saddle main body, and the shaft is contained in the concave part via the opening part.

5. A saddle attached to a base plate of a tremolo unit or a bridge of a string instrument, wherein the saddle includes a saddle main body and a string pressing member rotatably attached to the saddle main body, wherein the saddle main body includes a string inserting part through which a string is inserted from the block side and a string receiving part at which a string drawn from the string inserting part to a neck side of string instrument is received, wherein the string pressing member is supported in a condition in which a supporting part is rotatably supported in order to enable an end part of the neck side of the string receiving part side to approach closer to and be further away from the string receiving part, wherein at an end part opposite to the neck side of the string pressing member, an operating part is arranged which makes the end part be further away from the saddle main body by pressing the saddle main body, and wherein the string receiving part includes an inclining surface which is a rising slope toward the neck side, and a top part of the string pressing member has a shape fitting to the inclining surface.

* * * * *